March 20, 1956     H. M. HOPPER     2,739,217
CIGARETTE LIGHTER ATTACHMENT
Filed April 17, 1953     2 Sheets-Sheet 1
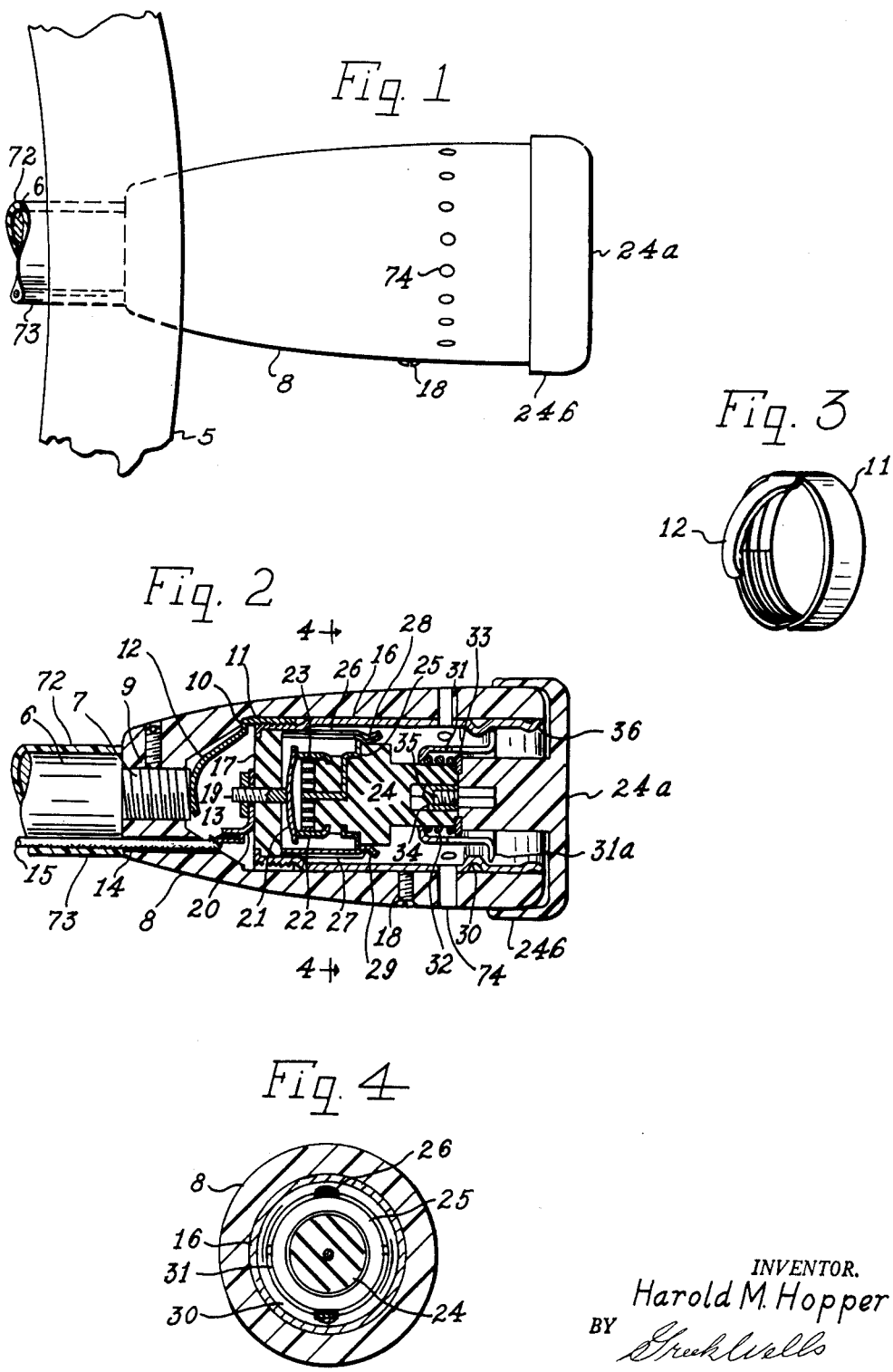
INVENTOR.
Harold M. Hopper March 20, 1956 H. M. HOPPER 2,739,217
CIGARETTE LIGHTER ATTACHMENT
Filed April 17, 1953 2 Sheets-Sheet 2
Fig. 5
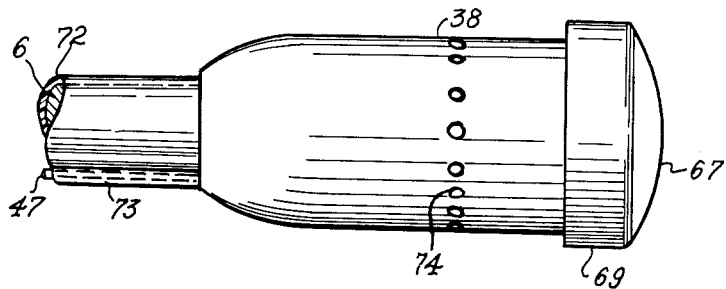
Fig. 6
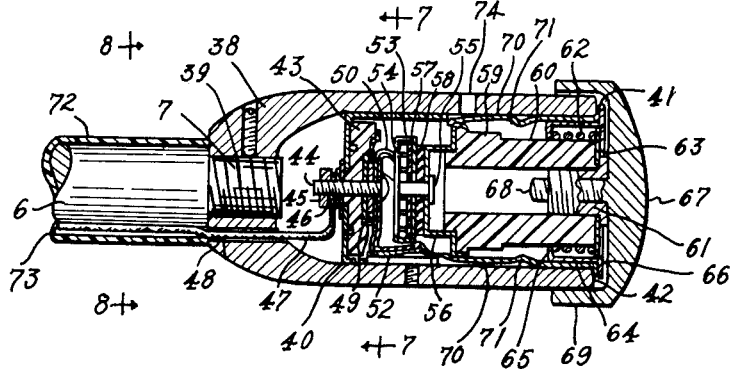
Fig. 7
Fig. 8
INVENTOR.
Harold M. Hopper
BY
Stuhlwell
atty

United States Patent Office 2,739,217
Patented Mar. 20, 1956

2,739,217

CIGARETTE LIGHTER ATTACHMENT

Harold M. Hopper, Missoula, Mont.

Application April 17, 1953, Serial No. 349,412

1 Claim. (Cl. 219—32)

My invention relates to a cigarette lighter attachment which is adapted to be mounted on the outer end of a rod such as the gear shift lever rod or the turn indicator lever rod of an automobile. It has heretofore been proposed to mount the lighter on the gear shift lever. See for example, the patent to Jackson, No. 2,037,027.

It is the principal purpose of my invention to provide a simple, easily mounted lighter which is composed of a cup-like body that has a threaded aperture in the bottom thereof which threads onto the tip of a gear shift lever and the like, and serves as a handle in the same way as the present handles now apply, together with a socket member that seats in the cup-like body and provides the necessary contact and terminal parts for a heater plug which can be inserted and removed from the socket.

The nature and advantages of my invention will appear more fully from the following description and the accompanying drawings wherein a preferred form of the invention is illustrated. It should be understood, however that the drawings and description are illustrative only and are not intended to limit the invention except insofar as it is limited by the claim.

In the drawings:

Figure 1 is a somewhat diagrammatic view illustrating a portion of the steering wheel and the gear shift lever on an automobile, showing my invention as applied thereto;

Figure 2 is a longitudinal sectional view through one form of the lighter attachment illustrating the interior construction thereof;

Figure 3 is a perspective view of a contact finger band that is used in the form of my invention shown in Figure 2;

Figure 4 is a sectional view taken on the line 4—4 of Figure 2;

Figure 5 is a side view of another form of the invention;

Figure 6 is a longitudinal sectional view of the form of the device shown in Figure 5;

Figure 7 is a sectional view taken on the line 7—7 of Figure 6; and

Figure 8 is a sectional view taken on the line 8—8 of Figure 6.

Referring now in detail to the drawings, the numeral 5 indicates a portion of the steering wheel of an automobile and the numeral 6 indicates a gear shift lever which is a rod having a reduced threaded extension 7 that is normally adapted to receive a handle for operating the lever. Similar rods with reduced threaded extensions are also utilized for the turn indicators for some automobiles. Both forms of my invention embodies a cup-like body 8, which is preferably made of metal although it may be made of a moulded plastic composition. The body 8 has a threaded aperture 9 in the bottom end thereof to receive the threaded extension 7 of the rod 6. In the form of my invention shown in Figures 2 to 4, the body 8 has a shoulder 10 on the interior thereof which is adapted to form a stop for a split threaded band 11 that carries a contact finger 12. The contact finger 12 is formed to extend into the threaded base portion 13 of the hollow interior of the body 8. The tip of the finger 12 extends across the aperture 9 in position to engage the end of the threaded extension 7. The extension 7 may vary somewhat in length, but the construction of the band 11 and the finger 12 allows the finger to be extended or bent inward to accommodate the variations. The finger 12 is somewhat resilient and integral with the band 11. The body 8 has a passage 14 through it for receiving a conductor 15 to supply current to the lighter.

A socket 16 has its inner end closed by a block 17 of insulating material. The socket is threaded to receive the band 11 and is slidably fitted into the body 8. A set screw 18 is used to secure the socket 16 in the body 8. The block 17 of insulation has a threaded terminal 19 fixed therein for reception of a terminal connection 20 of the conductor 15. The terminal 19 carries a spring contact 21 which is adapted to engage one terminal 22 of the heat coil 23 that is carried by a heater plug 24. The other terminal of the heater coil 23 is a band 25 that is imbedded in the heater plug 24.

The socket 16 carries spring contacts 26 and 27 which are bimetallic thermostats that are provided with hooks at 28 and 29 to engage over the band 25 when the heater plug 24 is pushed into the socket 16 to the position shown in Figure 2. These thermostats 26 and 27 are bent outwardly when heated so as to clear the band 25 to release the plug 24.

The plug 24 and the shell 16 are so constructed that the plug is caused to snap back out of position to engage the terminal 22 with the contact 21 whenever the hooks 28 and 29 clear the band 25. The construction by which this action is accomplished comprises a detent ring 30 formed on the shell 16, a flanged split sleeve 31 that is slidably mounted on the plug 24 and a spring 32 seated in the sleeve 31 and engaging a ring 33 on the plug 24. The plug 24, as shown, is made in two sections which are connected by a threaded socket 34 in one section and a screw 35 secured in the other section. The ring 33 is mounted between the two sections of the plug 24. The handle portion 24a of the plug 24 is formed with a flange 24b to enclose the end of the body 8.

The plug 24 is held against removal from the socket 16 by providing the sleeve with an inwardly bulging portion 36 at its outer end with which the flange 31a of the split sleeve 31 engages. The split sleeve 31 will yield inwardly enough to permit the plug to be withdrawn from the socket 16.

In the form of the invention shown in Figures 5, 6 and 7, the body 38 is metal. It is threaded at 39 to receive the threaded extension 7 of the lever 6. The interior of the body 38 is shaped to receive a socket 40 which has an outwardly turned open end 41 that seats on the outer end 42 of the body 38. In the bottom of the socket 40 a disk 43 of insulation is seated. Extending through the disk 43 is a terminal screw 44. The screw 44 has a nut 45 thereon which clamps a terminal clip 46 on a conductor 47 in place. The conductor 47 extends through an aperture 48 in the body 38. Heat expansible contact springs 50, 51 and 52 are clamped to the screw 44 by a nut 49. The springs 50, 51 and 52 are made of the same material as the springs 26 and 27. When heated they spread apart. They serve to conduct current from the screw 44 to a flanged ring 53 that provides electrical connection to one end of a high resistance heater wire 54. The other end of the wire 54 is secured to a stud 55. A metal cup 56 is secured by the stud 55 in fixed relation to the ring 53. Insulating washers 57 and 58 of mica are used to insulate the heater wire 54 from the flange of the ring 53 and to insulate the cup 56 from the ring 53. The ring 53 is one contact element for the heater wire 54 and the cup 56 is the other contact element for the wire 54.

A hollow plug 59 of insulation is secured in the cup 56.

This plug has a reduced section 60 which is threaded to receive a flat headed screw 61. A coiled spring 62 is mounted on the section 60. A washer 63 beneath the head of the screw 61 holds the spring 62 on the section 60. A sleeve 64 fits over the spring 62. The sleeve 64 has an inwardly turned flange 65 that fits snugly on the section 60 and provides a seat for the spring 62. The sleeve 64 has an outwardly turned flange 66 that engages the end 41 of the socket 40. A cap handle 67 is secured to the screw 61 by a screw threaded stud 68 on the handle that is threaded into the screw 61. The handle 67 covers the open end of the body 38 and has a flange 69 that overlaps the body 38.

The heater unit composed of the parts 53 to 69 inclusive, is removably held in the socket 40. The socket 40 has spring fingers 70 that engage the rim of the cup 56. These fingers have shoulders 71 providing yieldable stops to hold the heater unit in the body 38 when the spring contacts 50, 51 and 52 release the ring 53. When the heater wire 54 is to be heated, the operator pushes the cap handle 67 inward. This compresses the spring 62 because the flanges 65 and 66 on the sleeve 64 hold the sleeve 64 and the inner end of the spring 62. The spring contacts 50, 51 and 52 hook over the ring 53 and current flows through the heater wire 54 from the ring 53 to the stud 55 and the cup 56 to the spring fingers 70 on the socket 40 which is grounded through the body 38 to the lever 6.

The insulated conductor 47 is secured on the lever 6 and protected by a sleeve 72 of a yielding insulation material such as a vinyl chloride resin compound of the type used in garden hose. This sleeve has a tubular channel 73 which holds the conductor 47. When applied to the lever 6, the sleeve 72 protects the conductor 47 and keeps it in place.

The body 8 is preferably provided with a series of air holes 74 to permit air circulation. This cuts down the transfer of heat to the open end of the body from the heater element.

It is believed to be evident from the foregoing description that I have provided a simple and novel cigarette lighter handle attachment for the gear shift levers and the like of automobiles. The construction is such that the lighter performs the same function as the present handles now applied on such levers, with the added function of providing a simple, convenient lighter. In the form shown in Figures 2–4, the band 11 with its finger 12, is an effective means for electrically grounding the socket 16 to the lever 6 when a plastic body 8 is used, even though the threaded extensions 7 may vary considerably in length. The socket and heater plug construction provides for safety and convenience in the use of the lever with the live or hot contact 21 in the bottom of the socket 16 so that there is little possibility of shock or short circuit from the contact 21.

Having thus described my invention, I claim:

In a lighter of the kind described, an elongated cup-like body having a small threaded aperture extending through the bottom of the body for receiving a support rod having a threaded tip, a lighter socket secured in the body and having a band thereon at its closed end, the band being provided with a contact finger extending to said aperture to make contact with the rod tip, said socket having a wiring terminal at its closed end insulated from said band, for connection to a current supply conductor, the body having a conductor passage therein adjacent to said aperture, spaced contacts in said socket, one connected to said band through the socket wall and the other connected to said terminal, and a heater plug insertible into said socket, the plug having a heater coil therein provided with two terminals, one positioned to engage the band connected contact and the other to engage the terminal connected contact, one of said contacts comprising a bimetallic thermostat strip having a hook thereon adapted to hook over one of the heater plug terminals when cold, and to move away from the terminal when heated by the coil, to release the plug for withdrawal.

References Cited in the file of this patent

UNITED STATES PATENTS

| | | |
|---|---|---|
| 1,756,013 | Jackson | Apr. 29, 1930 |
| 1,944,924 | Cohen | Jan. 30, 1934 |
| 2,037,027 | Jackson | Apr. 14, 1936 |
| 2,145,205 | Bahr | Jan. 24, 1939 |
| 2,469,274 | Rein | May 3, 1949 |
| 2,557,225 | Hutchinson | June 19, 1951 |